United States Patent
Hahn

(10) Patent No.: US 9,874,033 B2
(45) Date of Patent: Jan. 23, 2018

(54) BOOM ARM AND CONCRETE-DISTRIBUTING BOOM

(71) Applicant: Putzmeister Engineering GmbH, Aichtal (DE)

(72) Inventor: Christian Hahn, Schönaich (DE)

(73) Assignee: Putzmeister Engineering GmbH, Aichtal (DE)

(*) Notice: Subject to any disclaimer, the term of this patent is extended or adjusted under 35 U.S.C. 154(b) by 0 days.

(21) Appl. No.: 15/485,721

(22) Filed: Apr. 12, 2017

(65) Prior Publication Data
US 2017/0218645 A1 Aug. 3, 2017

Related U.S. Application Data

(63) Continuation of application No. PCT/EP2015/073693, filed on Oct. 13, 2015.

(30) Foreign Application Priority Data

Oct. 14, 2014 (DE) .................. 10 2014 220 754

(51) Int. Cl.
*E04G 21/04* (2006.01)
*B65G 53/52* (2006.01)
*B67D 7/00* (2010.01)

(52) U.S. Cl.
CPC ..... *E04G 21/0445* (2013.01); *E04G 21/0436* (2013.01); *B65G 53/52* (2013.01); *B67D 7/002* (2013.01)

(58) Field of Classification Search
CPC . E04G 21/0445; E04G 21/0436; E04G 21/04; B67D 7/002; B65G 53/52
See application file for complete search history.

(56) References Cited

U.S. PATENT DOCUMENTS 3,707,990 A * 1/1973 Schaible .................. B60P 1/36
137/615
6,719,009 B1 * 4/2004 Bissen .................. B66C 23/64
137/615

(Continued)

FOREIGN PATENT DOCUMENTS

CN 201 245 983 Y 5/2009
CN 202 706 568 U 1/2013

(Continued)

OTHER PUBLICATIONS

English translation of International Preliminary Report on Patentability, PCT/EP2015/073693, dated Nov. 3, 2016.

*Primary Examiner* — Anita M King
(74) *Attorney, Agent, or Firm* — Bose McKinney & Evans LLP

(57) ABSTRACT

An inventive boom arm for a concrete-distributing boom. The boom arm has an elongate box-profile support formed from two flanges and two webs connecting the flanges laterally. The boom arm has first and second articulation points spaced apart in the longitudinal direction of the boom arm. A first flange opening is disposed at the first articulation point and a second flange opening is disposed at the second articulation point. A sealing-partition seals a cavity region of the box-profile support at least in a region of the first and second flange openings. The sealing partition can be provided in the form of a plate that continuously spans the cavity region between the first and second articulation points and is connected laterally to the webs. The first articulation point is located at the end of the boom arm and is arranged within the cavity region and is covered by the partition plate.

12 Claims, 2 Drawing Sheets

(56) References Cited

U.S. PATENT DOCUMENTS

| 6,755,212 | B1 * | 6/2004 | Anderson | B66C 23/64 |
| | | | | 137/615 |
| 2013/0078072 | A1 * | 3/2013 | Yelistratov | E02F 3/38 |
| | | | | 414/722 |
| 2017/0260761 | A1 * | 9/2017 | Fugel | B66C 23/64 |

FOREIGN PATENT DOCUMENTS

| CN | 202 882 436 U | 4/2013 |
| DE | 32 00 829 A1 | 9/1982 |
| DE | 10 2006 049 487 A1 | 4/2007 |
| DE | 10 2011 078 780 A1 | 1/2013 |
| JP | S 62-94140 U | 6/1987 |
| WO | WO 2013/045568 A1 | 4/2013 |

* cited by examiner

BOOM ARM AND CONCRETE-DISTRIBUTING BOOM

RELATED APPLICATIONS

This application is a continuation of PCT/EP2015/073693, filed Oct. 13, 2015, which claims priority to DE 10 2014 220 754.1, filed Oct. 14, 2014, both of which are hereby incorporated herein by reference in their entireties.

BACKGROUND

The invention relates to a boom arm for a concrete-distributing boom, having an elongate box-profile support which is formed, at least sectionally, from two flanges and two webs connecting the flanges laterally and which, at an end portion, exhibits two points of articulation which are spaced apart from one another in the longitudinal direction of the arm and are intended for the articulation of a hydraulic pivot drive, and having a sealing-partition arrangement for sealing a cavity region of the box-profile support, at least in the region of flange openings at the points of articulation. The invention further relates to a concrete-distributing boom having at least one boom arm of this kind.

In the articulation region, the respective pivot drive is firstly connected to mast arms of concrete-distributing booms and secondly the arms must be connected to one another. These both occasionally require the opening of the box-profile support. In order to prevent water from penetrating the cavity region of the arm, the openings must be closed again. In practice, sealing partitions that have hitherto been separated from one another are installed for each opening region. A trough is thereby created beneath the drive cylinder, in which water or ice and dirt can accumulate. These accumulations lead to additional loads and can cause damage to the support structure. To remedy the situation, conventional designs provide a procedure in which a hole is introduced into the web or flange plate and a pipe is welded in. This, in turn, causes a high notch effect in the components and usually leads to additional weight.

SUMMARY

Using this as a starting point, this disclosure further improves the products known in the state of the art and creates an easily producible boom arm structure for a concrete-distributing boom which is also robust in terms of the ingress of water and dirt.

This disclosure emerges from the basic idea of welding into the arm profile a welding partition that is adapted over the course of the entire region to be sealed. Accordingly, it is proposed according to this disclosure that the sealing-partition arrangement should have a single partition plate which spans the cavity region between the points of articulation continuously or completely in the longitudinal direction of the arm and is connected laterally to the webs. It is evident that a single partition plate of this kind can also be formed by a plurality of segments or assembled plate portions, provided a continuous, inwardly sealed arrangement is guaranteed. In this way, weld seams can be dispensed with by comparison with conventional solutions, thereby reducing the production cost and the number of welding points producing an unfavorable notch effect. Accumulations of water and dirt under the pivot drive can be drained away via the end of the boom arm at the attachment to the next arm. The solution according to this disclosure can be used both on arms with internal and also with external flanges. A particular advantage results, however, when used in arms with external flanges, i.e. overlapping the webs on the periphery, as in this case a flange jump, i.e. a changeover from external to internal flange, can be avoided. In this way, the greater resulting geometrical moment of inertia of external flanges can be used in the region of the articulated connection of the arms too. Moreover, a notch case resulting from a flange jump is avoided.

An advantageous embodiment envisages that the first point of articulation located in the region of the end of the boom arm is arranged within the cavity region and is covered by the partition plate opposite to a flange opening at the end of the boom arm. As a result, independent emptying of water etc. is also possible in a simple manner.

The second point of articulation distal from the end of the boom arm is advantageously accessible via a flange opening and separated from the cavity region to be sealed by the partition plate, so that a free space is created for the attachment of a hydraulic cylinder and, at the same time, the cavity region of the box-profile support remains sealed against water ingress.

A further improvement in this respect can be achieved in that the partition plate which is elongated in strip form and bent in a longitudinal direction according to the desired profile is connected on its longitudinal side edges in a substance-bonded manner preferably by means of welding seams to the mutually facing inner surfaces of the webs. It is also favorable for the partition plate to end on at least one of its face edges at the inner surface of a flange.

So that water accumulations can be avoided insofar as possible from the very outset, it is advantageous for the partition plate to form the floor of a trough delimited laterally by the webs, said trough being capable of being emptied via a flange opening at the end of the boom arm.

Another structurally advantageous embodiment envisages that the flanges continuously bear against the longitudinal edges of the webs externally in the longitudinal direction of the arm.

In order to realize the connection of the box structure in an easily accessible region, it is advantageous for the flanges to be connected at their mutually facing inner surfaces to the mutually averted outer surfaces of the webs by means of longitudinal welding seams.

For the creation of articulated connections, it is favorable for the points of articulation to exhibit bearing bushes inserted in bores in the webs.

It is also favorable for the box-profile support to exhibit at the particularly offset end portion a bending spindle for the articulated connection of another boom arm and for the partition plate to run between the bending spindle and the adjacent point of articulation for the pivot drive.

In order to avoid breaking into the flange plates, it is advantageous for the flange openings to be formed by continuously delimited cutouts in the flanges.

The subject matter of this disclosure is also a concrete-distributing boom, in particular for a truck-mounted concrete pump, with a plurality of boom arms connected to one another in articulated fashion intended to control a concrete-conveying line, wherein at least one boom arm is configured according to this disclosure with the advantages described above.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
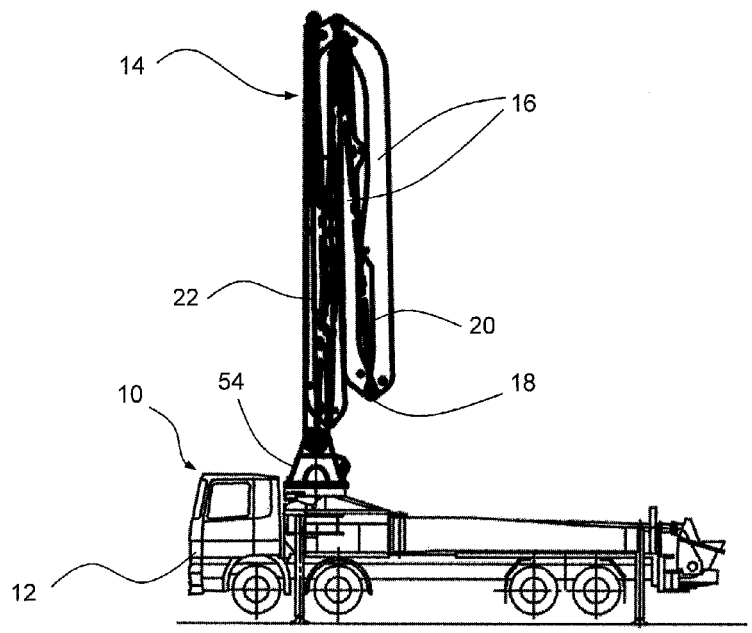
FIG. 1 shows a truck-mounted concrete pump with an expandable, multi-arm concrete-distributing boom in side view.

The truck-mounted concrete pump 10 shown in FIG. 1 comprises a vehicle 12 and a concrete-distributing boom 14 transportable thereon having a plurality of boom arms 16 which are connected to one another by means of articulated joints 18 and are pivotable in respect of one another by means of hydraulic pivot drives 20 on the articulated joints, so that a concrete-distributing line 22 guided along the boom can be variably positioned in a working region with an end hose.

Figure 2:
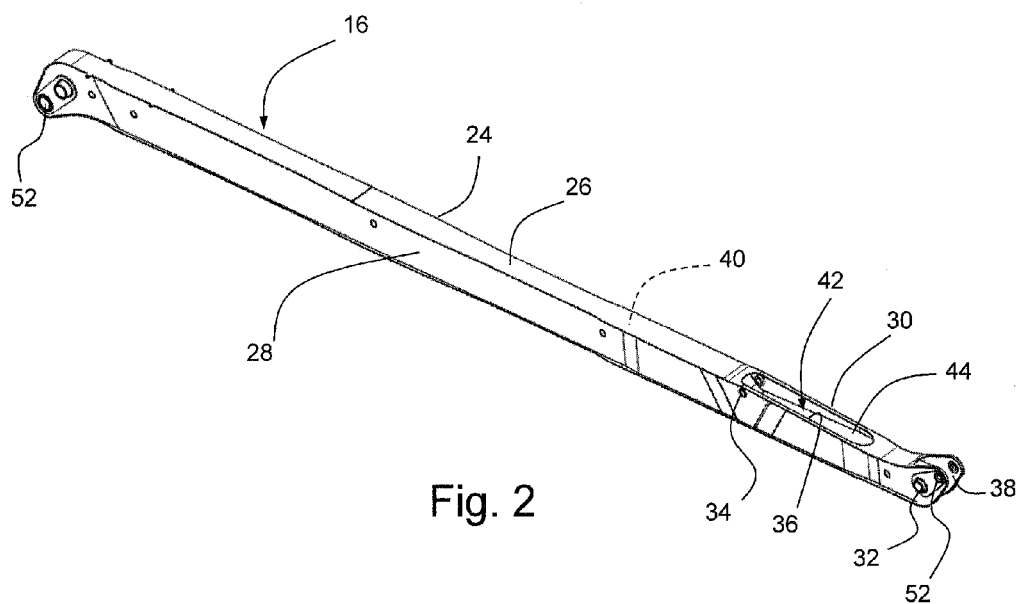
FIG. 2 shows a boom arm of the concrete-distributing boom in perspective view.

FIG. 2 shows a boom arm 16 (for example, the fourth boom arm of the arm assembly in FIG. 1) which, between its offset ends, is composed as an elongate box-profile support 24 made up of two flanges 26 and two webs 28 which connect the flanges 26 laterally in rectangular form in cross section as a welded structure.

Figure 3:
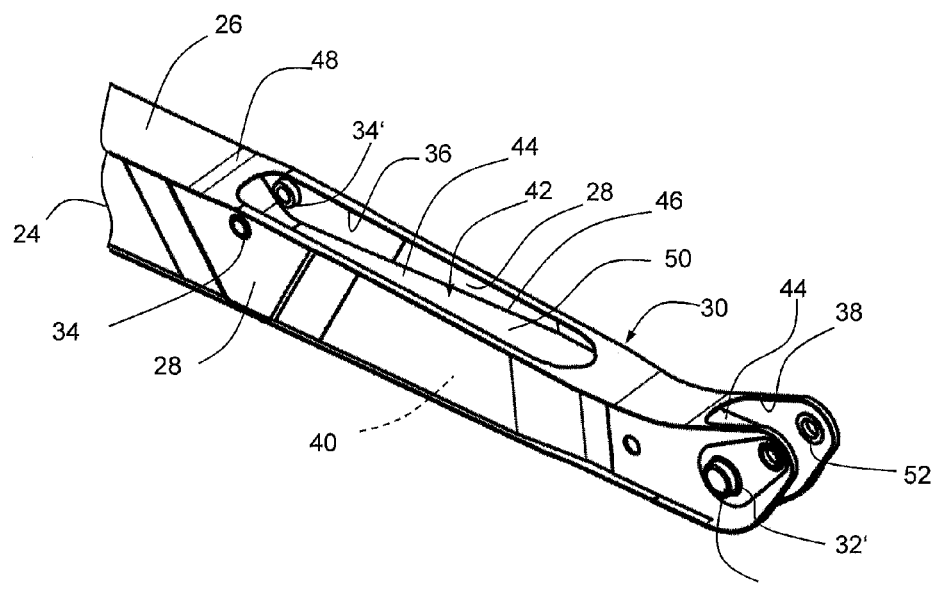
FIG. 3 shows an end section of the boom arm as an enlarged view of FIG. 2.

As can be seen from FIG. 3, the boom arm 16 exhibits at one end portion 30 two points of articulation 32, 34 spaced apart from one another in the longitudinal direction of the arm and intended for engagement of the hydraulic pivot drive 20. These are formed by bearing bushes 32', 34' inserted in bores in the webs 28.

In order to seal the cavity region 40 of the box-profile support 24 at the flange openings 36, 38 too, a sealing partition arrangement 42 is provided. This comprises a single partition plate 44 which extends continuously from the first point of articulation 32 located more proximately on the end of the boom arm to the second point of articulation 34 distal from the end of the boom arm and is closely connected on its longitudinal sides to the webs 28.

Figure 4:
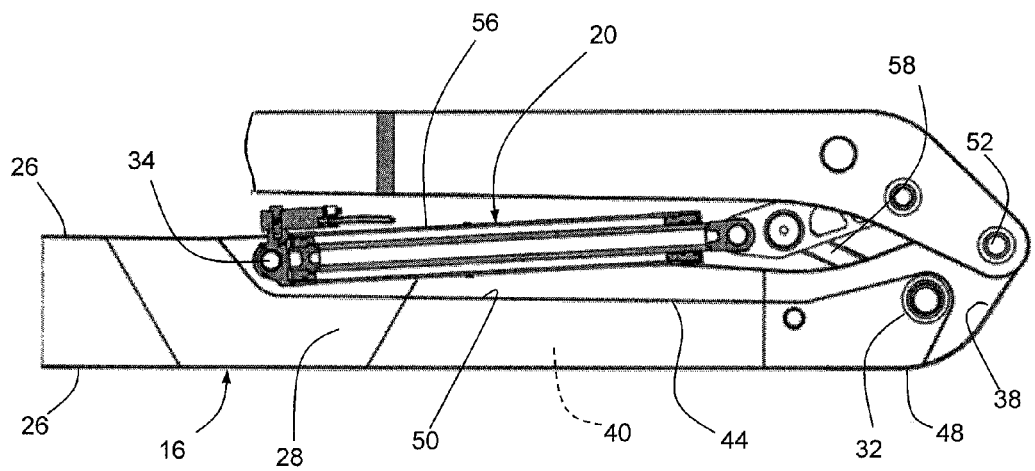
FIG. 4 shows a pair of boom arms of the concrete-distributing boom connected in an articulated manner with an assigned pivot drive in a broken-off central vertical section.

As can also be seen from the section in the vertical arm center plane in FIG. 4, the first point of articulation 32 is therefore arranged between the webs 28 within the cavity region 40 of the boom arm 16 and covered by the partition plate 44 in respect of the flange opening 38 at the end of the boom arm. On the other hand, the second point of articulation 34 is accessible via the flange opening 36 for attachment of the pivot drive 20 and separated from the cavity region 40 to be sealed by the partition plate 44.

The partition plate 44 elongated in strip form and formed from a flat iron material is connected in a substance-bonded manner at its longitudinal side edges by means of longitudinal welding seams 46 to the mutually facing inner surfaces of the webs 28. The partition plate 44 is likewise tightly connected to the flanges 26 via transverse welding seams 48 at its face edges. In this way, the partition plate 44 creates the floor of a trough 50 laterally delimited by the webs 28, which trough can be emptied when water enters via the flange opening 38 at the end of the boom arm.

In the welded structure of the boom arm 16, the flanges 26 continuously bear against the longitudinal edges of the webs 28 on the outside, wherein the welding seams run along the outer edges of the webs 28 facing away from the cavity region 40. The flange openings 36, 38 in this case are formed by continuously delimited cutouts in the flanges 26.

The boom arm 16 exhibits on each of its two offset fork-shaped ends a bending spindle 52 intended for the articulated connection of a boom arm. Only the first boom arm is connected at one end to a boom pedestal 54 on the vehicle 12, while the last (fifth) boom arm supports the end hose of the concrete-distributing line 22 on the end side. As can be best understood from FIG. 4, the pivot drive 20 engages with its hydraulic cylinder 56 with the trough 50, where it is attached in an articulated manner on the floor side to the second point of articulation 34, while the end on the bar side is articulated via deflection levers 58 on the outside on the articulated bushings 32' of the first point of articulation 32.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A boom arm for a concrete-distributing boom, comprising:
    a box-profile support formed from two flanges and two webs connecting the flanges laterally;
    the boom arm having first and second articulation points spaced apart in the longitudinal direction of the boom arm, a first flange opening disposed at the first articulation point and a second flange opening disposed at the second articulation point;
    a sealing-partition arrangement that seals a cavity region of the box-profile support at least in a region of the first and second flange openings, the sealing partition arrangement having a single partition plate continuously spanning the cavity region between the first and second articulation points and connected laterally to the webs;
    wherein the first articulation point is located at an end of the boom arm and is arranged within the cavity region and is covered by the partition plate.

2. The boom arm as claimed in claim 1, wherein the second articulation point is spaced from the end of the boom arm and is accessible via the second flange opening, the second articulation point being outside the cavity region that is sealed by the partition plate.

3. The boom arm as claimed in claim 1, wherein the partition plate is elongate web-shaped and is connected on its longitudinal side edges in a substance-bonded manner to mutually facing inner surfaces of the webs.

4. The boom arm as claimed in claim 3, wherein the substance-bonding comprises weld seams.

5. The boom arm as claimed in claim 1, wherein the partition plate terminates on at least one face edge at an inner surface of one of the flanges.

6. The boom arm as claimed in claim 1, wherein the partition plate forms the floor of a trough delimited laterally by the webs, said trough configured to be emptied via the first flange opening.

7. The boom arm as claimed in claim 1, wherein the flanges continuously bear against the longitudinal edges of the webs.

8. The boom arm as claimed in claim 1, wherein the flanges are connected at mutually facing inner surfaces to mutually averted outer surfaces of the webs by longitudinal weld seams.

9. The boom arm as claimed in claim 1, wherein the two articulation points include bearing bushes inserted in bores in the webs.

10. The boom arm as claimed in claim 1, wherein the box-profile support has at an offset end portion a bending spindle for the articulated connection of another boom arm, and the partition plate extends between the bending spindle and the first articulation point for a pivot drive.

11. The boom arm as claimed in claim 1, wherein the flange openings are formed by continuously delimited cutouts.

12. A concrete-distributing boom with a plurality of boom arms connected to one another in an articulated fashion configured to control a concrete-conveying line, wherein at least one of the boom arms is configured according to claim 1.

* * * * *